Oct. 23, 1923.　　　　　　　C. A. BOWEN　　　　　　　1,471,824

GLASS MELTING POT

Filed March 27, 1922

INVENTOR
Clinton A. Bowen,
BY
ATTORNEY

Patented Oct. 23, 1923.

1,471,824

UNITED STATES PATENT OFFICE.

CLINTON A. BOWEN, OF CORNING, NEW YORK, ASSIGNOR TO CORNING GLASS WORKS, OF CORNING, NEW YORK, A CORPORATION OF NEW YORK.

GLASS-MELTING POT.

Application filed March 27, 1922. Serial No. 547,118.

*To all whom it may concern:*

Be it known that I, CLINTON A. BOWEN, a citizen of the United States, residing at Corning, in the county of Steuben and State of New York, have invented new and useful Improvements in Glass-Melting Pots, of which the following is a specification.

This invention relates to melting pots, of the class known as continuous melting pots, or devices of this character wherein the compound for producing the glass is fed thereto at one point and removed continuously therefrom at another point.

The prime object is to improve the construction and increase the efficiency, utility, and economy of construction and operation of devices of this character.

With these and other objects in view, which will appear as the nature of the invention is better understood, the same consists in an improved construction and novel arrangement of the parts as specifically hereinafter set forth and claimed.

In the drawings forming part of this specification wherein is illustrated the preferred form of the embodiment of the invention capable of carrying the same into practical operation:—

Figure 1:
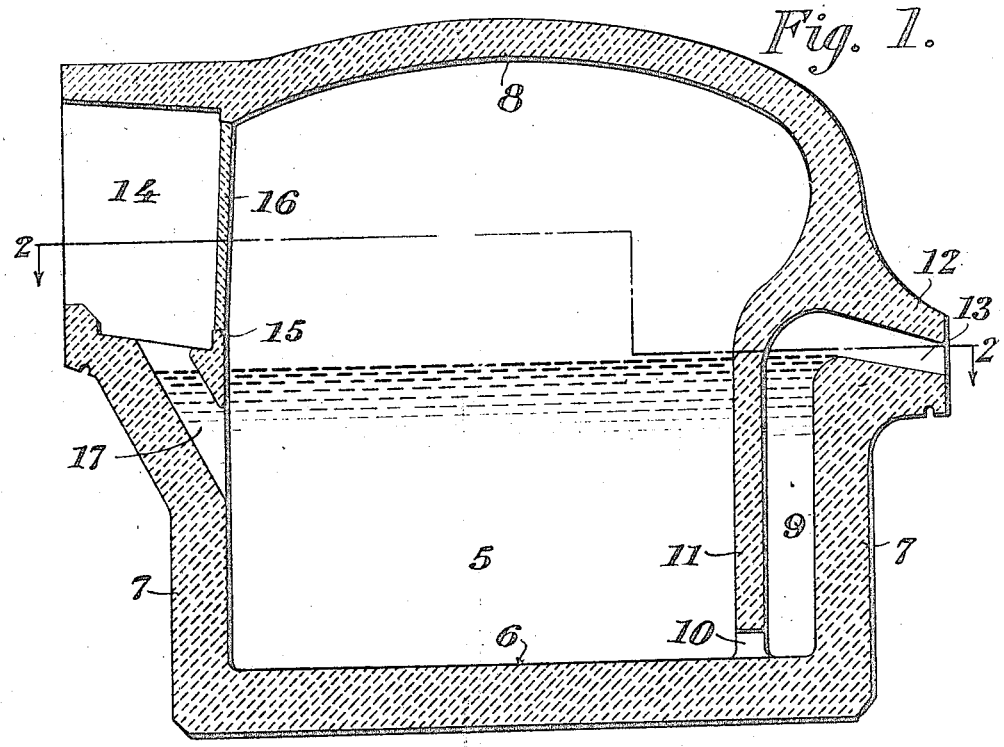
Figure 1, is a vertical longitudinal section.
Figure 2:
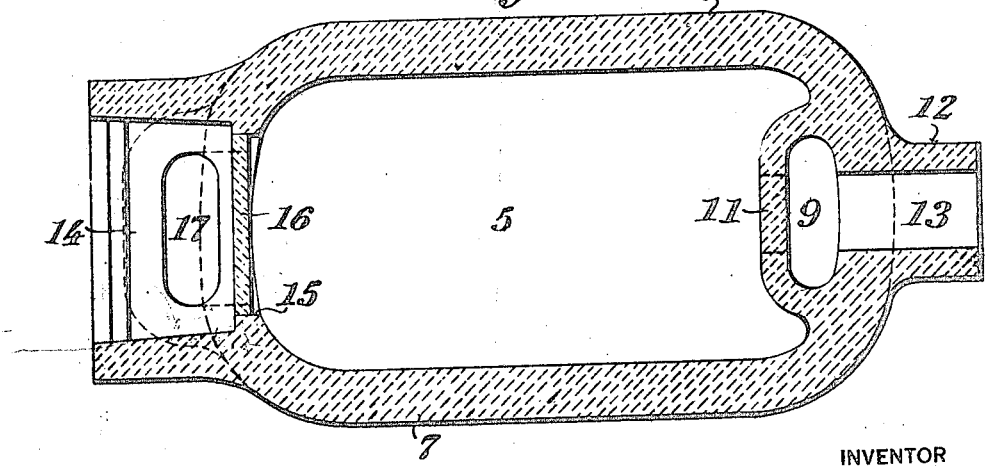
Fig. 2, is a horizontal section on the line 2—2 of Fig. 1.

The improved device is constructed in one single mass of the refractory material usually employed in manufacturing melting pots for glass and for similar purposes, and comprises a body portion represented as a whole at 5, with a bottom 6, vertical walls 7, and dome like top 8. The improved body is designed to be located within the furnace in the usual manner.

The front of the body 5 is provided with a well or chamber 9 which is in communication with the interior of the body by means of a passage 10, between said well and body, said well being formed by a vertical web 11 constructed integrally with the vertical wall of the body 5 to the rear of the front end thereof, and said passsage 10 being formed by terminating the web 11 a distance from the bottom 6.

Intermediate the front vertical wall, the body 5, is constructed with an enlarged portion 12, having an inclined opening 13 which communicates with the well 9. The opening 13 is designed to allow molten glass to continuously flow by gravity from the well 9 and therefore its heighth from the bottom 6 of the body is approximately that of the normal level of glass.

It will be seen that the refined molten glass will flow from the body 5 through the passage 10 into the well 9, and so supply the latter. From the well 9 the glass will flow by gravity down the inclined opening 13 into a trough, or other suitable conveyor (not shown).

The device is particularly designed to be used in connection with a continuous tube-drawing apparatus, and in actual practice the glass is led by means of a trough onto the rotating spindle of such apparatus.

The end of the body 5 opposite to the well 9, is constructed with an open mouth 14, which is in direct communication with the interior of the body. The mouth 14 is located above the normal level of the glass and near the dome of the body, and by preference, it is formed of sufficient size to permit the insertion of a ladle, or other apparatus, into the body, for the purpose of charging or discharging the contents of the body. In the mouth 14, there is formed a seat 15, for a removable cover or door 16.

As the glass in the body is being continuously discharged therefrom through the inclined opening 13, it is necessary that the supply in the body be replenished at very frequent intervals. In actual practice the device forming the subject matter of this invention is used in a reheating furnace, and, therefore, molten glass is ladled from another furnace and deposited in the body 5. In the ordinary form of devices of this character, considerable heat is lost from the interior of the body 5, each time the door 16 is removed to permit the insertion of a ladle of molten glass.

To overcome this difficulty, and thereby prevent excessive loss of heat, an inclined opening 17 is formed in the bottom of the mouth 14 below the door opening 15. The opening 17 is of sufficient size to permit molten glass deposited on the bottom of the mouth to quickly flow into the body 5.

It will be observed that by my improvement the mouth 14 of the pot can be sealed by the door 16, and the body 5 charged with molten glass, without requiring the removal of the door, in the manner heretofore employed.

Having thus described my invention, what I claim is:—

1. A glass melting pot composed of a body closed at the top and having a mouth near the top thereof and projecting therefrom, said mouth being provided with a door, and an opening formed in the bottom of said mouth and communicating with said body below said door, said opening being so positioned that molten glass can be fed into the body below the normal working level of the glass therein.

2. A glass melting pot composed of a body closed at the top and having an opening in the form of a mouth and a discharge opening, said discharge opening being positioned at the normal working level of the glass in the body, and said mouth being positioned above the normal working level of the glass, a removable cover for closing the mouth, and an opening in the wall of the body below the mouth, said opening being so positioned that molten glass can be fed into the body below the normal working level of the glass therein without removing the cover from the mouth.

In testimony whereof, I have hereunto signed my name.

CLINTON A. BOWEN.